Patented June 6, 1939

2,160,940

UNITED STATES PATENT OFFICE 2,160,940

VINYLIDENE CHLORIDE CO-POLYMERS

Edgar C. Britton, Clyde W. Davis, and Fred Lowell Taylor, Midland, Mich., assignors to The Dow Chemical Company, Midland, Mich., a corporation of Michigan No Drawing. Application April 1, 1938,
Serial No. 199,496

12 Claims. (Cl. 260—78)

This invention relates to the product obtained by polymerizing together monomeric vinylidene chloride and the monomer of at least one unsaturated ester or diester of a dicarboxylic acid, the alcohol residue in the ester having the general formula

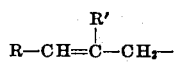

wherein one of the radicals R and R' is hydrogen, and R is hydrogen, phenyl or a lower alkyl radical such as methyl, ethyl or propyl, and R' is hydrogen, halogen, or a lower alkyl radical.

We have found that a variety of useful synthetic resinous and plastic products may be prepared by the co-polymerization of vinylidene chloride and one or more unsaturated esters or diesters of dicarboxylic acids wherein the alcohol residue has the general formula given above. Such materials, herein referred to as co-polymers, may be prepared by heating together a mixture of the polymerizable materials at temperatures from about room temperature up to about 100° C. We have ordinarily deemed it expedient to carry out the co-polymerization in the presence of catalysts capable of accelerating the said reaction. Such catalysts include, for example, light, benzoyl peroxide, a mixture of benzoyl peroxide, chloroacetyl chloride, and tetraethyl lead, or a mixture of uranium nitrate or acetate and benzoyl peroxide, and the like. When uranium salts were employed in the catalyst mixture, the polymerizable materials were ordinarily subjected to the radient energy from a mercury vapor lamp.

The polymeric bodies produced after subjecting the monomeric mixture to the conditions outlined above for a period varying from a few hours to about 3 weeks, depending upon the activity of the particular mixture, varied in properties from gel-like materials to spongy solids and through bone-like materials to hard brittle masses. Most of the products obtained were capable of being molded easily at moderate working temperatures. Some of the co-polymers, however, lack the necessary coherence to be readily molded. The softening point of all of the co-polymers produced was substantially lower than that of polymeric vinylidene chloride alone while in most cases the decomposition temperature of the co-polymer was substantially the same as that of polymeric vinylidene chloride.

Our new co-polymers are, in the main, insoluble in boiling ortho-dichlorobenzene. A few of the materials have been found to swell under the action of ortho-dichlorobenzene at its boiling point and in a few isolated instances, there appears to be some actual solution or dispersion of the co-polymer in the said solvent. The insolubility of most of our co-polymers in ortho-dichlorobenzene and similar solvents even at high temperatures is an indication of their general utility in the preparation of solvent-proof compositions.

Many of our new co-polymers are highly resistant to attack by concentrated sulphuric acid. Some of the materials discolor slightly on long standing in this reagent but do not appear to be decomposed thereby to any appreciable extent. It may be said in general that the co-polymers defined by the appended claims are quite resistant to the action of most common acids and alkalis and of most of the common organic solvents including the alcohols, hydrocarbons, chlorinated hydrocarbons, ketones, etc.

The following table illustrates the practice of our invention and describes some of the principal properties of various of our new co-polymers of vinylidene chloride and an unsaturated ester of the class described. In the table such ester is referred to as a "modifier", from its effect in modifying the properties of the co-polymer as compared with those of polymeric vinylidene chloride itself. Proportions of reagents are given in per cent by weight and the amount of modifier entering into the co-polymeric product is calculated from the chlorine analysis of the co-polymer obtained.

Table

| Run No. | Co-polymerizable material | Per cent modifier | Per cent vinylidene chloride | Polymerization temperature, °C. | Time, hours | Extent of polymerization, per cent | Properties of co-polymeric products ||||||
|---|---|---|---|---|---|---|---|---|---|---|---|---|
| | | | | | | | Per cent chlorine content | Per cent vinylidene chloride | Per cent modifier | Softening point, °C. | Decomposition temperature, °C. | Molding temperature, °C. |
| 1 | Diallyl maleate | 25 | 75 | 30 | 45 | 11.6 | 68.03 | 92.8 | 7.2 | 140 | 193 | 162 |
| 2 | ----do---- | 50 | 50 | 30 | 148 | 25.4 | 63.0 | 86.0 | 14.0 | 120 | 160 | 130 |
| 3 | ----do---- | 75 | 25 | 30 | 148 | 20.5 | 36.26 | 49.5 | 50.5 | | 171 | 130 |
| 4 | ----do---- | 50 | 50 | 40° for 127 hrs.; 60° for 22 hrs. | | 71.8 | 41.53 | 56.8 | 43.2 | | | 178* |
| 5 | Diallyl fumarate | 25 | 75 | 30 | 45 | 13.9 | 66.54 | 90.8 | 9.2 | 135 | 177 | 162 |
| 6 | ----do---- | 50 | 50 | 30 | 148 | 59.2 | 45.18 | 61.5 | 38.5 | 160 | 180 | 162 |
| 7 | ----do---- | 75 | 25 | 30 | 148 | 44.0 | 26.69 | 36.4 | 63.6 | 120 | 180 | 162 |
| 8 | Diallyl allylmalonate | 25 | 75 | 30° for 66 hrs.; 60° for 5 hrs. | | 19.5 | 69.93 | 95.6 | 4.4 | 150 | 190 | 178 |

Table—Continued

| Run No. | Co-polymerizable material | Per cent modifier | Per cent vinylidene chloride | Polymerization temperature, °C. | Time, hours | Extent of polymerization, per cent | Properties of co-polymeric products ||||||
|---|---|---|---|---|---|---|---|---|---|---|---|---|
| | | | | | | | Per cent chlorine content | Per cent vinylidene chloride | Per cent modifier | Softening point, °C. | Decomposition temperature, °C. | Molding temperature, °C. |
| 9 | Diallyl oxalate | 25 | 75 | 40 | 45 | 34.5 | 68.27 | 93.3 | 6.7 | 130 | 180 | 162 |
| 10 | ......do............ | 50 | 50 | 30 | 148 | 17.5 | 62.00 | 84.7 | 15.3 | 110 | 170 | 130 |
| 11 | ......do............ | 75 | 25 | 30 | 148 | 24.0 | 41.10 | 56.3 | 43.7 | | 165 | 130* |
| 12 | ......do............ | 20 | 80 | 60 | 12 | 68.6 | 62.44 | 85.3 | 14.7 | 150 | 200 | 178 |
| 13 | Diallyl succinate | 25 | 75 | 40 | 45 | 31.5 | 67.83 | 92.7 | 7.3 | 140 | 190 | 162 |
| 14 | ......do............ | 50 | 50 | 30 | 148 | 71.5 | 47.66 | 65.2 | 34.8 | | 180 | 178 |
| 15 | ......do............ | 75 | 25 | 60 | 48 | 55.5 | 30.56 | 41.8 | 58.2 | | 165 | 160 |
| 16 | Di(chloroallyl) adipate | 22.5 | 77.5 | 22° for 16 hrs. 40° for 32 hrs. | | 87.0 | 61.29 | 79.9 | 21.1 | | 175 | 178* |
| 17 | Diallyl sebacate | 50 | 50 | 30 | 148 | 76.0 | 46.35 | 63.4 | 36.6 | | 170 | 130* |
| 18 | ......do............ | 75 | 25 | 60 | 48 | 58.0 | 29.15 | 39.8 | 60.2 | | 175 | 130* |
| 19 | ......do............ | 25 | 75 | 40 | 45 | 49.5 | 67.26 | 91.9 | 8.1 | 150 | 190 | 162 |
| 20 | Diallyl phthalate | 25 | 75 | 40 | 43 | 48.5 | 67.43 | 92.2 | 7.8 | 155 | 195 | 162 |
| 21 | ......do............ | 50 | 50 | 22° for 16 hrs. 40° for 102 hrs. | | 41.0 | 53.37 | 73.0 | 27.0 | 120 | 200 | 178 |
| 22 | ......do............ | 75 | 25 | 22° for 42 hrs. 40° for 102 hrs. | | 21.0 | 40.52 | 55.4 | 44.6 | 140 | 200 | |
| 23 | Diallyl malonate | 10 | 90 | 40 | 24 | 35.7 | 71.06 | 97.1 | 2.9 | 186 | 210 | |
| 24 | Dimethallyl oxalate | 25 | 75 | 40 | 100 | 38.5 | 63.09 | 86.2 | 13.8 | 125 | 175 | 170 |
| 25 | ......do............ | 50 | 50 | 40 | 100 | 37.0 | 49.44 | 67.5 | 32.5 | | 185 | 170 |
| 26 | ......do............ | 75 | 25 | 40 | 100 | 28.5 | 30.71 | 41.9 | 58.1 | | 180 | 170* |
| 27 | Dimethallyl maleate | 10 | 90 | 40° for 56 hrs. 60° for 16 hrs. | | | | | | | | |
| 28 | Diallyl adipate | 10 | 90 | 40 | 24 | 32.7 | 70.59 | 96.5 | 3.5 | 183 | 205 | |
| 29 | Mono-methallyl maleate | 10 | 90 | 40 | 24 | 39.0 | 70.85 | 96.7 | 3.3 | 190 | 215 | |

*This co-polymer could not be molded at temperatures up to the one indicated, because of lack of coherence.

The examples have shown the preparation of co-polymers of vinylidene chloride with allyl, 2-methyl allyl, and chloro-allyl esters of a variety of dibasic acids. We have found that similar products may be prepared through the use of other unsaturated esters of these and similar dibasic acids. For example, the cinnamyl and crotonyl esters of oxalic, malonic, succinic, maleic, fumaric, sebacic, adipic, and phthalic acids co-polymerize with vinylidene chloride to produce products having properties similar to those described above.

While this invention contemplates principally the co-polymers from a binary polymerizable mixture of vinylidene chloride and the previously defined unsaturated esters of dicarboxylic acids, it also includes co-polymers from polynary polymerizable mixtures comprising vinylidene chloride, the dicarboxylic acid esters, and one or more additional polymerizable materials. For example, to provide a co-polymer which, when molded, will neither dissolve nor swell in boiling ortho-dichlorobenzene, a small amount, i. e., from 0.5 to 2.0 per cent, of allyl methacrylate may be added to the monomeric mixture prior to polymerization.

Our new co-polymers may be further modified in their physical properties and general appearance and utility by incorporating therein various effect materials, such as coloring agents, fillers, and plasticizers. Such materials may be added in any expedient manner, before or after co-polymerization, depending on the effect such materials may have on the polymerization rate of the monomers or on the properties of the finished co-polymer.

Other modes of applying the principle of our invention may be employed instead of those explained, change being made as regards the materials or process employed, provided the ingredients or steps stated by any of the following claims or the equivalent of such stated ingredients or steps be employed.

We therefore particularly point out and distinctly claim as our invention:

1. A co-polymer of from about 36.4 to 97.1 per cent of vinylidene chloride and correspondingly from about 63.6 to 2.9 per cent of co-polymerizable materials at least one of which is an unsaturated ester selected from the group consisting of the allyl, 2-methyl-allyl, 2-chloroallyl, crotonyl, and cinnamyl esters of dicarboxylic acids.

2. A co-polymer of from about 36.4 to 97.1 per cent of vinylidene chloride and correspondingly from about 63.6 to 2.9 per cent of an allyl ester of a dicarboxylic acid.

3. A co-polymer of from about 36.4 to 97.1 per cent of vinylidene chloride and correspondingly from about 63.6 to 2.9 per cent of a 2-methyl-allyl ester of a dicarboxylic acid.

4. A co-polymer of from about 36.4 to 97.1 per cent of vinylidene chloride and correspondingly from about 63.6 to 2.9 per cent of diallyl oxalate.

5. A co-polymer of from about 36.4 to 97.1 per cent of vinylidene chloride and correspondingly from about 63.6 to 2.9 per cent of diallyl maleate.

6. A co-polymer of from about 36.4 to 97.1 per cent of vinylidene chloride and correspondingly from about 63.6 to 2.9 per cent of di-(2-methylallyl)-oxalate.

7. The process which comprises polymerizing a mixture of monomers comprising between about 25 and about 90 per cent of vinylidene chloride and correspondingly about 75 to about 10 per cent of an unsaturated ester selected from the group consisting of the allyl, 2-methyl-allyl, 2-chloro-allyl, crotonyl, and cinnamyl esters of dicarboxylic acids, thereby to produce a co-polymer containing from about 36.4 to 97.1 per cent of vinylidene chloride co-polymerized with from 63.6 to 2.9 per cent of the unsaturated ester.

8. The process which comprises mixing between about 25 and about 90 per cent of monomeric vinylidene chloride with correspondingly from about 75 to about 10 per cent of the monomeric form of an allyl ester of a dicarboxylic acid and subjecting the mixture to polymerizing conditions.

9. The process which comprises mixing between about 25 and about 90 per cent of monomeric vinylidene chloride with correspondingly from about 75 to about 10 per cent of the monomeric form of a 2-methyl-allyl ester of a dicarboxylic acid and subjecting the mixture to polymerizing conditions.

10. The process which comprises mixing between about 25 and about 90 per cent of monomeric vinylidene chloride with correspondingly from about 75 to about 10 per cent of the monomeric form of diallyl oxalate and subjecting the mixture to polymerizing conditions.

11. The process which comprises mixing between about 25 and about 90 per cent of monomeric vinylidene chloride with correspondingly from about 75 to about 10 per cent of the monomeric form of diallyl maleate and subjecting the mixture to polymerizing conditions.

12. The process which comprises mixing between about 25 and about 90 per cent of monomeric vinylidene chloride with correspondingly from about 75 to about 10 per cent of the monomeric form of di-(2-methyl-allyl)-oxalate and subjecting the mixture to polymerizing conditions.

EDGAR C. BRITTON.
CLYDE W. DAVIS.
FRED LOWELL TAYLOR.